United States Patent
Honjo et al.

(10) Patent No.: US 6,866,937 B2
(45) Date of Patent: Mar. 15, 2005

(54) GLASS PLATE WITH OXIDE FILM AND PROCESS FOR PRODUCING SAME

(75) Inventors: Hiroshi Honjo, Mie (JP); Katsuto Tanaka, Mie (JP); Hideki Yamamoto, Mie (JP); Yoshihiro Nishida, Mie (JP)

(73) Assignee: Central Glass Company, Limited, Yamaguchi (JP)

( * ) Notice: Subject to any disclaimer, the term of this patent is extended or adjusted under 35 U.S.C. 154(b) by 47 days.

(21) Appl. No.: 09/930,258

(22) Filed: Aug. 16, 2001

(65) Prior Publication Data

US 2002/0051870 A1 May 2, 2002

(30) Foreign Application Priority Data

Aug. 22, 2000 (JP) ........................................ 2000-250668
Dec. 19, 2000 (JP) ........................................ 2000-385151

(51) Int. Cl.⁷ .............................................. B32B 17/06
(52) U.S. Cl. ...................... 428/432; 428/426; 428/428; 428/192; 428/702
(58) Field of Search ................................ 428/428, 432, 428/433, 434, 192, 697, 702, 426

(56) References Cited

U.S. PATENT DOCUMENTS

| | | | | |
|---|---|---|---|---|
| 5,137,749 A | * | 8/1992 | Yamazaki et al. | 427/108 |
| 5,364,685 A | * | 11/1994 | Nakashima et al. | 296/84.1 |
| 5,421,877 A | * | 6/1995 | Hayakawa et al. | 106/453 |
| 5,489,409 A | * | 2/1996 | Koganezawa et al. | 156/108 |
| 5,724,187 A | * | 3/1998 | Varaprasad et al. | 359/265 |
| 5,817,586 A | * | 10/1998 | Harada et al. | 501/17 |
| 6,013,372 A | | 1/2000 | Hayakawa et al. | |
| 6,210,805 B1 | * | 4/2001 | Sunahara | 428/425.6 |

FOREIGN PATENT DOCUMENTS

| | | |
|---|---|---|
| EP | 0433915 | 6/1991 |
| EP | 0657393 | 6/1995 |
| EP | 0882686 | 12/1998 |
| EP | 0911300 | 4/1999 |
| JP | 9227159 | 9/1997 |
| JP | 2756474 | 3/1998 |
| JP | 10060665 | 3/1998 |
| JP | 10231146 | 12/1998 |

* cited by examiner

Primary Examiner—Stephen Stein
(74) Attorney, Agent, or Firm—Crowell & Moring LLP

(57) ABSTRACT

The invention relates to a glass plate including (a) a glass substrate having a major surface divided into a central major portion and a peripheral portion surrounding the central major portion; and (b) an oxide film formed on the central major portion by baking a precursory film. The oxide film is not formed on the peripheral portion such that the peripheral portion is free from shrinkage force caused by the baking.

5 Claims, 5 Drawing Sheets

GLASS PLATE WITH OXIDE FILM AND PROCESS FOR PRODUCING SAME

BACKGROUND OF THE INVENTION

The present invention relates to a glass plate with an oxide film, for vehicular window glasses (e.g., automotive front windshield and rear and side windows), architectural glass plates (e.g., building window glass) and industrial glass plates (e.g., showcase glass). The present invention further relates to a process for producing such glass plate.

There are vehicular, architectural and industrial glass plates with various functional films (having functions of heat shielding, ultraviolet shielding, electromagnetic shielding and the like) for the purpose of having comfort, improved design, privacy, environmental safety and the like.

Recently, there have been proposals of architectural and automotive window glasses having hydrophilicity, anti-fogging property and stain resistance by the photocatalytic effect of titanium oxide.

U.S. Pat. No. 6,013,372, corresponding to Japanese Patent JP-B2-2756474, discloses that the surface of a substrate is coated with an abrasion-resistant photocatalytic coating comprised of a semiconductor photocatalyst.

Japanese Patent Unexamined Publication JP-A-9-227159 discloses vehicular front and rear window glasses with transparent layers containing a photocatalytic semiconductor material.

JP-A-10-60665 discloses a metal oxide film formed on a substrate. This metal oxide film contains titania and silica and is prepared by applying a coating solution containing (a) a metal oxide sol (containing titania) and (b) a colloidal silica in the form of chain and then by heating the coated substrate.

EP-A1-0882686, corresponding to JP-A-10-231146, discloses an anti-fogging and stain-prevented glass article having an alkali shielding film and a photocatalytic film.

SUMMARY OF THE INVENTION

Let us suppose a case in which a glass plate (e.g., vehicular rear window glass and building window glass) with a functional film is prepared by applying a coating solution to the entire outer surface of a glass substrate and then by baking the coated glass substrate. In this case, the inventors unexpectedly found that the coated film shrinks during the baking and the resulting shrinkage force acts on the peripheral portion of the glass substrate. With this, the obtained glass plate may have a drawback in which the distortion of the light reflected from its peripheral portion is out of a desired range. If the glass substrate is bent and/or tempered during the baking in the above case, the shrinkage force also acts on the peripheral portion of the glass substrate. With this, the obtained glass plate may have a drawback in which its curvature deviates from the originally designed one and another drawback in which a desired reflection distortion is not obtained.

It is therefore an object of the present invention to provide a glass plate with a functional oxide film, which is free from the above-mentioned drawbacks.

According to the present invention, there is provided a glass plate comprising (a) a glass substrate comprising a major surface divided into a central major portion and a peripheral portion surrounding the central major portion; and (b) an oxide film formed on the central major portion by baking a precursory film. The peripheral portion is free from the oxide film such that the peripheral portion is free from the above-mentioned shrinkage force caused by the baking.

According to the present invention, there is provided a process for producing the glass plate. This process includes (a) applying a coating solution to said central major portion, thereby forming thereon said precursory film; and (b) baking said precursory film into said oxide film.

DESCRIPTION OF THE PREFERRED EMBODIMENTS

Figure 1:
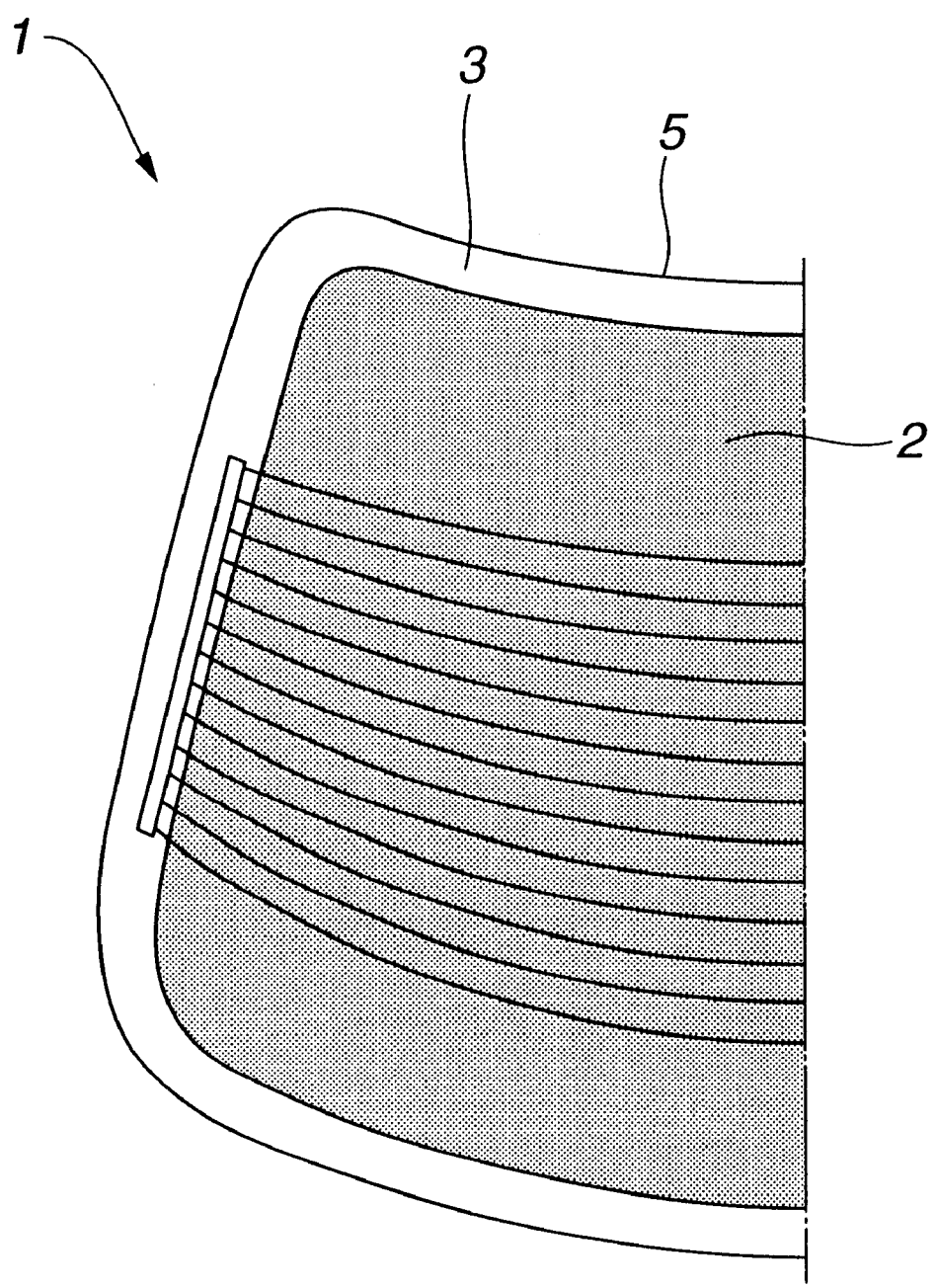
FIG. 1 is a partial plan view showing an automotive rear window glass according to Example 1 of the present invention.

The glass plate according to the invention may be used as a vehicular window glass (particularly an automotive window glass), or as an architectural or industrial glass plate. The automotive window glass may have an outwardly curved shape by a bending operation. Similarly, the architectural or industrial glass plate may also have a curved shape thereby. Furthermore, the glass plate may be tempered in view of breaking safety such that the glass plate is fractured into small pieces when it is broken. The temperature for conducting the bending and/or the tempering is preferably from about 560° C. to about 700° C. This temperature range substantially overlaps with that for conducting the baking of the precursory film. Therefore, it is preferable to conduct the bending and/or tempering operation during the baking of the precursory film. In some cases, however, it is possible to conduct the bending and/or tempering operation after the baking of the precursory film. Furthermore, prior to the baking and the bending and/or tempering, it is optional to subject the precursory film to a preliminary baking at a temperature lower than that of the baking. Furthermore, the temperature of the preliminary baking can be set as high as possible, so long as it is lower than the softening point of the glass substrate. Thus, the preliminary baking can be conducted at a temperature of about 550–620° C. for a period of time of 5–30 minutes.

It is possible to produce the glass plate by forming an oxide film only on the central major portion of the outer major surface of a glass substrate, except its peripheral portion. With this, the peripheral portion is not affected by shrinkage force caused by the precursory film baking. The width of the peripheral portion may be varied depending on the type of the oxide film, the curvature of the glass substrate and the like. It is preferable to have a width enough to obtain a desired curvature and a desired reflection distortion. The width is preferably 10 mm or greater, more preferably 15 mm or greater. Furthermore, the width may be selected in accordance with the size, the thickness and the curvature of the glass substrate and the like. In case of automotive rear window glass, the width is preferably 15 mm or greater.

The raw material for forming the oxide film may be an oxide of at least one metal selected from Si, Ti, Zr, Sn, Zn, Ta and the like. By selecting a suitable raw material(s), the oxide film may serve as a heat shielding film, an ultraviolet shielding film, a hydrophilic and anti-fogging film, a stain resistant film, an electromagnetic shielding film, a reflection free film, a radio transmission film, a conductive film, a decorative film and/or the like.

The oxide film can be a photocatalytic film, if it contains at least $TiO_2$ crystals. This photocatalytic film can have functions of hydrophilicity, anti-fogging, stain resistance and the like through the photoexcitation of $TiO_2$ crystals by ultraviolet rays of the sunlight. Therefore, it is preferable to form the photocatalytic film on the outer side of a glass substrate. The photocatalytic film may further contain at least one oxide selected from $SiO_2$, $Al_2O_3$, $ZrO_2$, $SnO_2$, $CeO_2$ and the like. In order to improve the photocatalytic film in durability, it preferably contains at least one of $SiO_2$, $Al_2O_3$ and $ZrO_2$. It is improved in abrasion resistance by the containment of $SiO_2$. It is improved in water resistance and chemical resistance (e.g., alkali resistance) by $ZrO_2$. The containment of $ZrO_2$ also improves the photocatalytic activity of the photocatalytic film. Alkali resistance is an important property for architectural widow glasses, since an alkali liquid is used as a detergent for cleansing those glasses.

The $TiO_2$ source of the oxide film is not particularly limited, so long as $TiO_2$ crystals are produced after the baking of the precursory film. The $TiO_2$ source can be a commercial product of $TiO_2$ fine particles (powder) for photocatalyst, such as ST-01 and ST-21 of Ishihara Techno Co.; SSP-25 and SSP-20 of SAKAI CHEMICAL INDUSTRY CO., LTD.; PC-101 of Titan Kogyo K.K.; SUPER TITANIA F-6 and SUPER TITANIA F-5 of Showa Titanium Co.; and DN-22A of FURUKAWA CO., LTD. The $TiO_2$ source can also be a liquid-type commercial product for photocatalyst, such as STS-01 and STS-02 of Ishihara Techno Co.; PC-201 of Titan Kogyo K.K.; and A-6 and M-6 of TAKI CHEMICAL CO., LTD. Furthermore, it is possible to use a commercial product of a mixture of $TiO_2$ fine particles for photocatalyst and a silica raw material, such as ST-K01 and ST-K03 of Ishihara Techno Co. All of these are trade names.

The $SiO_2$ source of the oxide film is not particularly limited, so long as silicon oxide is produced after the baking of the precursory film. Examples of the $SiO_2$ source are alkoxysilanes (e.g., tetramethoxysilane, tetraethoxysilane, methyltrimethoxysilane, and methyltriethoxysilane), hydrolysates and polycondensates of these, and those stabilized with a stabilizer (e.g., acetylacetone). The $SiO_2$ source can also be a liquid-type commercial product such as COLCOAT P of COLCOAT Co., MSH2 of Mitsubishi Chemical Corp., and CSG-DI-0600 of Chisso Co. Similarly, other oxides sources can be metal alkoxides, hydrolysates and polycondensates of these, those stabilized with a stabilizer (e.g., acetylacetone), and liquid-type commercial products. If an alkoxide is used as an oxide source, an inorganic acid (e.g., hydrochloric acid, nitric acid and sulfuric acid) is added as a hydrolysis catalyst to the coating solution.

The coating solution for preparing the oxide film may contain a solvent capable of dissolving alkoxides and metal salts. Examples of the solvent are alcohols (e.g., methanol, isopropyl alcohol, and ethanol), diols (e.g., ethylene glycol oligomer, polyethylene glycol, propylene glycol oligomer, and hexylene glycol), water, cellosolve, and carbitol. The coating solution may further contain other additives such as thickener.

The manner of applying the coating solution to the surface of a substrate is not particularly limited. It can be conducted by a common method such as dip coating, spin coating, roller coating, bar coating, spraying, flexography, screen printing or the like. In the case of printing, it is not necessary to previously mask oxide-film-free portions of a glass substrate (i.e., the peripheral portion of the outer major surface and the entirety of the inner major surface). In methods other than printing, however, it is necessary to conduct the previous masking with a masking film, a UV curing resin or the like.

The baking (not the preliminary baking) for forming the oxide film can be conducted at a temperature of 560–700° C. With this, it becomes possible to provide the oxide film with a strong bonding to the glass substrate surface and with abrasion resistance, chemical resistance and the like.

The oxide film may have a thickness of 50–1,000 nm. With this, in case that the oxide film is, for example, a photocatalytic film, it is provided with photocatalytic activity and a high durability. The thickness is preferably from 50 to 500 nm. With this, it is possible by one application of the coating solution to obtain an oxide film having a good transparency and a higher durability.

The glass substrate used in the invention is not particularly limited. It is commonly made of a soda-lime-silicate glass and may be made of a clear glass (a colorless, transparent glass) or colored glass having a color of blue, bronze or green. The glass substrate is optionally formed on its inner major surface with a metal film, a metal wire(s), an oxide film, a resin film or the like by vapor deposition, sputtering, printing or the like. Furthermore, its inner major surface may be subjected to various treatments (e.g., etching and sand blasting). The thickness of the glass substrate is not particularly limited. It may be from 2 to 5 mm, if the glass plate is used as an automotive window glass.

The glass plate of the invention can be used for various purposes. For example, it can be used as vehicular front, rear and side window glasses, particularly automotive ones, and architectural window glasses, due to its functions of hydrophilicity, anti-fogging, stain resistance and the like. For achieving these functions, it is preferable to form the oxide film on the outer major surface of the glass substrate. The glass substrate may be flat or curved in shape and may or may not be tempered. Furthermore, the glass plate can be used for a double layer glass (sealed double-glazed unit) or a laminated glass.

Figure 2:
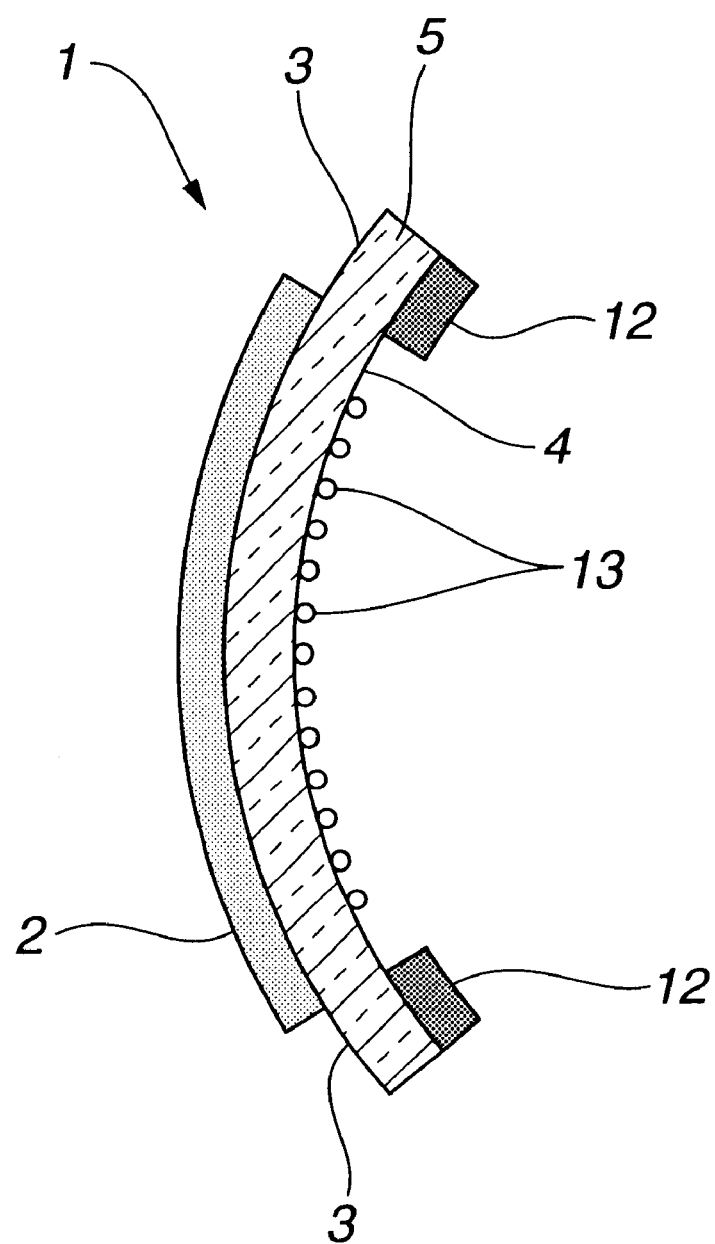
FIG. 2 is a sectional view of FIG. 1.
Figure 3:
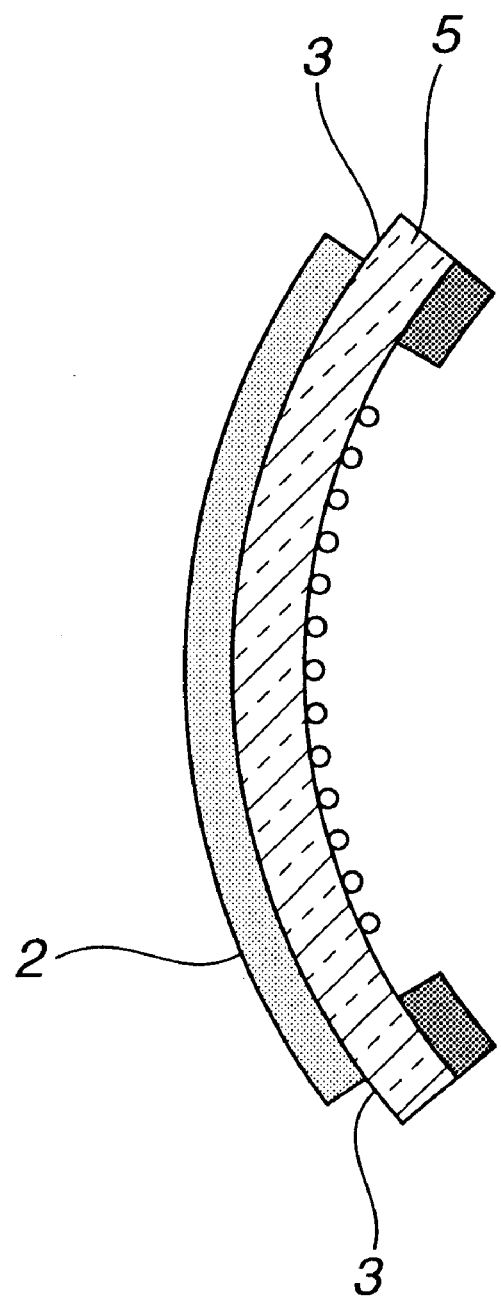
FIG. 3 is a sectional view showing another automotive rear window glass according to Example 2 of the present invention.
Figure 5:
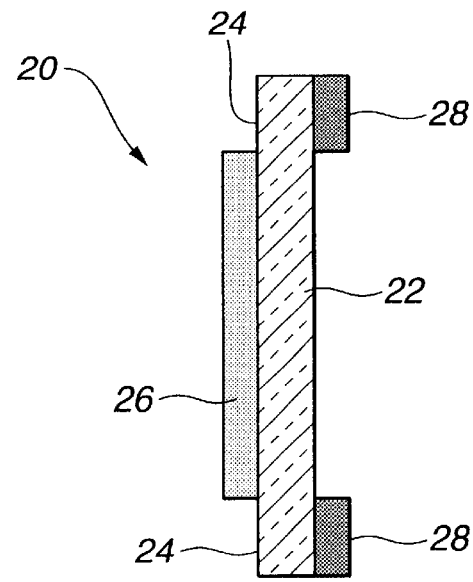
FIG. 5 is a sectional view of FIG. 4.

It is optional to form a colored film on the peripheral portion of the inner major surface of the glass substrate. In case that the glass plate is used as an automotive window glass (particularly an automotive rear window glass), the colored film can serve to conceal (a) terminals of anti-fogging wires and antenna wires and (b) attachments for attaching the glass plate to an automotive body. For this concealing, the colored film is preferably a dark-colored one. It is preferable to form the colored film in a region exactly opposed to the region of the oxide-film-free peripheral portion of the outer major surface of the glass substrate, as shown in FIGS. 2 and 5. With this, the oxide film and the colored film are not overlapped with each other, as shown in FIGS. 2 and 5. Thus, it is possible to improve the glass plate in external appearance. In other words, the omission of this colored film may lower its external appearance in case that the central major portion (having the oxide film) of the glass plate is noticeably different in external appearance from the peripheral portion (having thereon no oxide film) of the glass plate. It may not be preferable in external appearance to have the oxide film and the colored film partly overlapped with each other, as shown in FIG. 3, in case that the oxide film is noticeably different in visible light reflectance and external color tone from the glass substrate. With this, the color tone of the colored film, viewed from the oxide film side, may become different from the original color tone of the colored film. This may deteriorate the glass plate in external appearance. Although not shown in the drawings, it may not be preferable in function or external appearance that the oxide film and the colored film are not overlapped with each other, but have a gap therebetween. As shown in FIGS. 1–3, when the glass plate is used as an automotive window glass, it is optional to form antenna wires and/or conductive wires on the central portion of the inner major surface of the glass substrate.

The oxide film may contain titania crystals to have photocatalytic function. With this, when the oxide film is irradiated with ultraviolet rays of the sunlight or fluorescent light, it becomes possible to decompose organic matters on the oxide film, thereby making the oxide film surface clean and hydrophilic. Therefore, it improves visibility under rainy condition.

The following nonlimitative examples are illustrative of the present invention. Automotive window glasses were produced in Examples 1–3 and Comparative Example 1.

EXAMPLE 1

A coating liquid was prepared by dispersing, in a solvent that is a mixture of ethanol and 1-methoxy-2-propanol each being made of Kishida Chemical Co., (1) $ZrOCl_2$ of Kishida Chemical Co. as the raw material of $ZrO_2$, (2) CSG-DI-0600 (trade name) of Chisso Co., containing 6% of a siloxane oligomer in a mixture of ethanol and isopropanol, as the raw material of $SiO_2$, and (3) ST-K01 (trade name) of Ishihara Techno Co., in which the weight ratio of $TiO_2$ to $SiO_2$ is 8:2, in amounts such that the film contained 10 wt % of $ZrO_2$, 40 wt % of $SiO_2$ and 50 wt % of $TiO_2$.

Separately, a float glass plate of a soda-lime-silicate glass (color: green) having dimensions of 1,000 mm×1,800 mm×3.5 mm (thickness) was washed sufficiently with water, detergent and ceria. The resulting float glass plate was used as the glass substrate.

Then, a masking tape was applied to a first portion of the glass substrate, corresponding to the outer peripheral portion of the outer major surface of the glass substrate after the following cutting, and to a second portion of the glass substrate, corresponding to the entirety of the inner major surface thereof. Then, the coating liquid was applied to the glass substrate by dip coating. Immediately after that, the masking tape was removed.

Then, the coated glass substrate was subjected to a preliminary baking at 600° C. for 5 minutes, followed by cutting to have a predetermined shape and then seaming of the glass edge surfaces. Then, a black-color ceramic film (designated by numeral 12 of FIG. 2) of a desired design was formed by screen printing on a peripheral portion of the inner major surface of the glass substrate. This ceramic film was made from a paste containing a lead borosilicate frit containing a spinel pigment made of Cr, Mn and Cu. Then, a desired pattern of heating and antenna wires was formed on the central portion of the inner major surface by screen printing using silver paste. Then, the coated glass substrate was baked at 650° C., thereby obtaining an automotive rear window glass having the oxide film, the black-color ceramic film, and the heating and antenna wires. During this baking, the glass substrate was subjected to bending and tempering. In fact, the oxide film was a photocatalytic film having a thickness of 200 nm and a composition of 10 wt % $ZrO_2$, 40 wt % $SiO_2$ and 50 wt % $TiO_2$.

As shown in FIGS. 1 and 2, the obtained automotive window glass 1 was formed on its major central portion of the major outer surface of the glass substrate with the above-mentioned photocatalytic film 2, except the peripheral portion 3 of the major outer surface. This peripheral portion 3 had a minimum width of 40 mm and a maximum width of 70 mm. Furthermore, the window glass 1 was formed on its peripheral portion of the major inner surface 4 of the glass substrate 5 with the black-color ceramic film 12. This ceramic film 12 was formed in a manner to be opposed to the peripheral portion 3 of the major outer surface of the glass substrate 5, as shown in FIG. 2. Still furthermore, the window glass 1 was formed on its major central portion of the major inner surface of the glass substrate with heating wires 13.

The obtained window glass (test sample) was subjected to the following reflection distortion, curvature and photocatalytic capability evaluation tests. The results of these tests are shown in Table 1.

In the reflection distortion evaluation test, the image of a zebra pattern (while parallel stripes on a black board) was reflected from the major outer surface of the window glass and observed by a viewer. The window glass was judged as being A (good) when the distortion of the zebra pattern image was substantially the same as that of a glass substrate of a predetermined shape having no oxide film thereon. The window glass was judged as being B (satisfactory, but inferior to A) when the former was somewhat different from the latter, and as being C (not good) when the former was substantially different from the latter.

In the curvature evaluation test, the window glass was placed on an inspection table conforming to the predetermined desired shape of a standard window glass. Then, the clearance between the placed window glass and the inspection table was measured. The window glass was judged as being good when the clearance was 2 mm or less, and as being not good when it was greater than 2 mm.

In the photocatalytic capability evaluation test, the photocatalytic activity of the test sample was evaluated by the degree of decomposition of stearic acid on the film due to the ultraviolet irradiation. In this test, the test sample was immersed in a solution containing 3 wt % of stearic acid dissolved in ethanol, and then withdrawn from the solution at a rate of 8 mm/sec. After that, the test sample was irradiated for 1 hr with ultraviolet rays from a black light, FL15BLB (trade name) of Toshiba Denki Co. in a manner to have a ultraviolet strength of 4 mW/cm² (365 nm) at the coated surface of the test sample. The amount of stearic acid on the film was determined by measuring a peak strength (absorbance A) appearing within a range of 2910–2920 cm⁻¹ and derived from the C-H stretching vibration of stearic acid, using Paragon 1000 (trade name), that is, a FT-IR spectrophotometer of Perkin-Elmer Co., Ltd., before and after the application of stearic acid and after the ultraviolet irradiation for 1 hr. Then, a peak strength change as the degree of stearic acid decomposition was determined by the expression $\{(A_0-A_b)-(A_1-A_b)\} \times 1000$ where $A_b$ is the peak strength before the application of stearic acid, $A_0$ is the peak strength after the application of stearic acid but before the ultraviolet irradiation, and $A_1$ is the peak strength after the ultraviolet irradiation for 1 hr. The peak strength change was satisfactory. Therefore, the window glass was judged as being good in this test.

TABLE 1

| | Reflection Distortion Evaluation Test | Curvature Evaluation Test | Photocatalytic Capability Evaluation Test |
|---|---|---|---|
| Example 1 | A | Good | Good |
| Example 2 | A | Good | Good |
| Example 3 | B | Good | Good |
| Com. Ex. 1 | C | Not good | Good |

EXAMPLE 2

Example 1 was repeated except in that the size of the photocatalytic film 2 was enlarged such that the peripheral portion 3 on the outer major surface of the glass substrate 5 was adjusted to having a width of 15 mm, as shown in FIG. 3.

EXAMPLE 3

Example 1 was repeated except in that the size of the photocatalytic film was enlarged such that the peripheral portion on the outer major surface of the glass substrate was adjusted to having a width of 15 mm.

COMPARATIVE EXAMPLE 1

Example 1 was repeated except in that the photocatalytic film was formed on the entirety of the outer major surface of the glass substrate.

EXAMPLE 4

Figure 4:
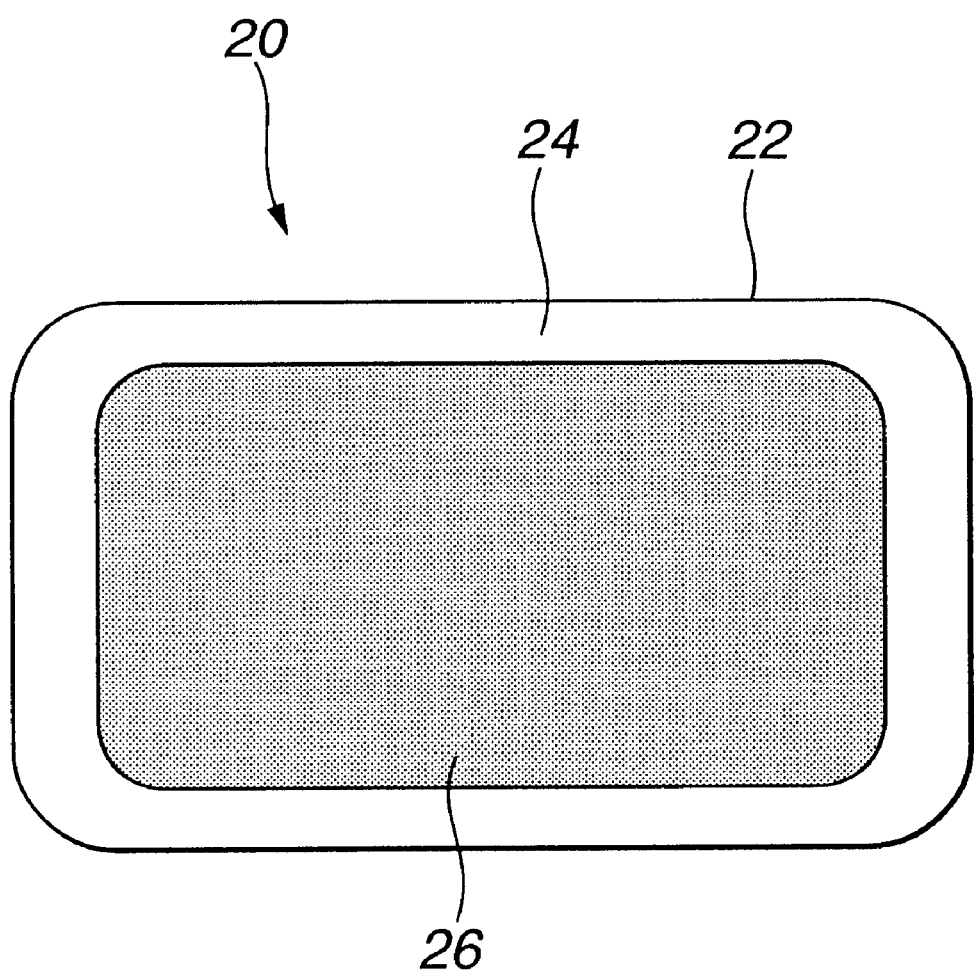
FIG. 4 is a plan view showing an industrial window glass according to Example 4 of the present invention.

Example 1 was repeated except in that an industrial window glass 20 for a microwave oven was produced by using a clear float glass plate (dimensions: 250 mm×300 mm×3.0 mm (thickness)) as the glass substrate 22, that the photocatalytic-film-free peripheral portion 24 of one major surface of the glass substrate 22 was formed to have a minimum width of 30 mm and a maximum width of 50 mm, as shown in FIG. 4. Although not shown in FIG. 5, the bending operation was conducted to make the window glass slightly curved.

As shown in FIGS. 4–5, the obtained window glass 20 was formed on its major central portion of the major surface of the glass substrate 22 with the photocatalytic film 26, except the peripheral portion 24. Furthermore, the window glass 20 was formed on its peripheral portion of the other major surface of the glass substrate 22 with the black-color ceramic film 28.

The obtained window glass (test sample) was subjected to the same evaluation tests as those of Example 1. The results are shown in Table 2.

TABLE 2

| | Reflection Distortion Evaluation Test | Curvature Evaluation Test | Photocatalytic Capability Evaluation Test |
|---|---|---|---|
| Example 4 | A | Good | Good |
| Example 5 | A | Good | Good |
| Example 6 | B | Good | Good |
| Com. Ex. 2 | C | Not good | Good |

EXAMPLE 5

Figure 6:
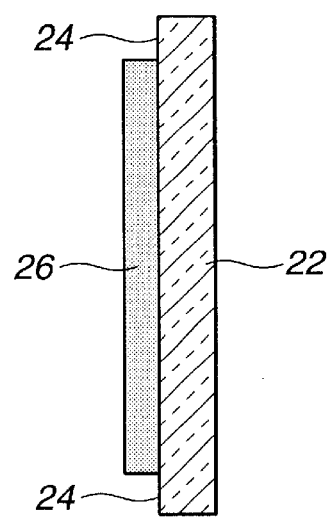
FIG. 6 is a sectional view showing an architectural window glass according to Example 5 of the present invention.

Example 4 was repeated except in that the size of the photocatalytic film 26 was enlarged such that the peripheral portion 24 on the major surface of the glass substrate 22 was adjusted to having a width of 15 mm and that the black-color ceramic film was not formed, as shown in FIG. 6, thereby forming an architectural window glass. In fact, the photocatalytic film 26 was formed on the outer major surface of the glass substrate.

EXAMPLE 6

Example 4 was repeated except in that the size of the photocatalytic film was enlarged such that the peripheral portion on the outer major surface of the glass substrate was adjusted to having a width of 10 mm.

COMPARATIVE EXAMPLE 2

Example 4 was repeated except in that the photocatalytic film was formed on the entirety of the outer major surface of the glass substrate.

The entire disclosure of Japanese Patent Application No. 2000-250668 filed on Aug. 22, 2000 and No. 2000-385151 filed on Dec. 19, 2000, including specification, drawings, claims and summary, of which priorities are claimed in the present application, is incorporated herein by reference in its entirety.

What is claimed is:

1. A glass plate comprising:
   a glass substrate comprising a major surface divided into a central major portion and a peripheral portion surrounding said central major portion; and
   an oxide film formed on said central major portion by baking a precursory film, said peripheral portion being free from said oxide film such that said peripheral portion is free from shrinkage force caused by said baking;
   wherein said oxide film is a photocatalytic film comprising titania crystals such that said glass plate is provided with at least one of hydrophilicity and stain resistance.

2. A glass plate according to claim 1, wherein said photocatalytic film further comprises at least one of $SiO_2$, $Al_2O_3$ and $ZrO2$.

3. A glass plate comprising:
   a glass substrate comprising a major surface divided into a central major portion and a peripheral portion surrounding said central major portion; and
   an oxide film formed on said central major portion by baking a precursory film, said peripheral portion being free from said oxide film such that said peripheral portion is free from shrinkage force caused by said baking;
   wherein said peripheral portion has a width of 15 mm or greater when said glass plate is used as a vehicular rear window glass.

4. A glass plate comprising:
   a glass substrate comprising a major surface divided into a central major portion and a peripheral portion surrounding said central major portion; and
   an oxide film formed on said central major portion by baking a precursory film, said peripheral portion being free from said oxide film such that said peripheral portion is free from shrinkage force caused by said baking;
   wherein said glass substrate further comprises another major surface comprising a peripheral portion, said peripheral portion of said another major surface having thereon a black-color ceramic film.

5. A glass plate comprising:

a glass substrate comprising a major surface divided into a central major portion and a peripheral portion surrounding said central major portion; and an oxide film formed on said central major portion by baking a precursory film, said peripheral portion being free from said oxide film such that said peripheral portion is free from shrinkage force caused by said baking;

wherein said peripheral portion has a width of 10 mm or greater.

* * * * *